United States Patent
Kugimiya et al.

(10) Patent No.: US 7,106,580 B2
(45) Date of Patent: Sep. 12, 2006

(54) MOBILE ELECTRONIC APPLIANCE

(75) Inventors: Tetsuya Kugimiya, Kawasaki (JP); Noriyasu Kawamura, Ome (JP); Minoru Mukai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 10/995,180

(22) Filed: Nov. 24, 2004

(65) Prior Publication Data

US 2005/0130470 A1 Jun. 16, 2005

(30) Foreign Application Priority Data

Nov. 28, 2003 (JP) ............................. 2003-400828

(51) Int. Cl.
*G06F 1/16* (2006.01)
(52) U.S. Cl. .................. 361/683; 361/679; 361/681; 361/862; 312/223.1; 312/223.2; 248/632; 248/176.1
(58) Field of Classification Search ............... 361/679, 361/680, 681, 682, 683, 724; 312/223.1, 312/223.2, 208.1, 208.4; 248/609, 632–634, 248/917, 176.1; 381/189, 306, 333, 388; 206/305, 320, 521, 576, 308, 720, 591, 592; 224/162, 258, 575–600; 190/102, 109, 110, 190/111; 360/97.02, 98.01; 369/75.1
See application file for complete search history.

(56) References Cited

U.S. PATENT DOCUMENTS

| | | | |
|---|---|---|---|
| 5,291,375 A | 3/1994 | Mukai | |
| 5,583,742 A * | 12/1996 | Noda et al. | 361/683 |
| 5,706,168 A * | 1/1998 | Erler et al. | 361/685 |
| 6,179,122 B1 * | 1/2001 | Moncrief et al. | 206/320 |
| 6,498,719 B1 | 12/2002 | Bridges | |
| 6,519,141 B1 * | 2/2003 | Tseng et al. | 361/683 |
| 6,522,763 B1 * | 2/2003 | Burleson et al. | 381/189 |
| 6,977,809 B1 * | 12/2005 | Bovino | 361/683 |
| 2002/0043608 A1 | 4/2002 | Nakata et al. | |
| 2002/0057813 A1 | 5/2002 | Burleson et al. | |
| 2002/0085342 A1 * | 7/2002 | Chen et al. | 361/683 |
| 2003/0179543 A1 | 9/2003 | Sri-Jayantha et al. | |
| 2004/0130866 A1 | 7/2004 | Itakura et al. | |

FOREIGN PATENT DOCUMENTS

| | | | | |
|---|---|---|---|---|
| JP | 10-322039 | | 12/1998 | |
| JP | 2892265 | | 2/1999 | |
| JP | 2001026722 A | * | 7/1999 | |
| JP | 11-353054 | | 12/1999 | |
| JP | 2003-167644 | | 6/2003 | |

* cited by examiner

*Primary Examiner*—Michael Datskovskiy
(74) *Attorney, Agent, or Firm*—Oblon, Spivak, McClelland, Maier & Neustadt, P.C.

(57) ABSTRACT

A mobile electronic appliance comprises a substantially box-shaped first casing having a display section housed therein and a substantially box-shaped second casing having an electronic unit housed therein. The first casing is folded such that the folded first casing is disposed to cover the upper surface of the second casing. The electronic appliance is carried under the state that the display section is closed. Swollen portions each having a void space included therein are formed in the four corner portions of the second casing. The swollen portions expanded outward are formed contiguous to side portions with sloped portions interposed therebetween. The distance between the swollen portion and the side portion is determined not to be smaller than the braking distance that is determined from a prescribed dropping height.

16 Claims, 7 Drawing Sheets

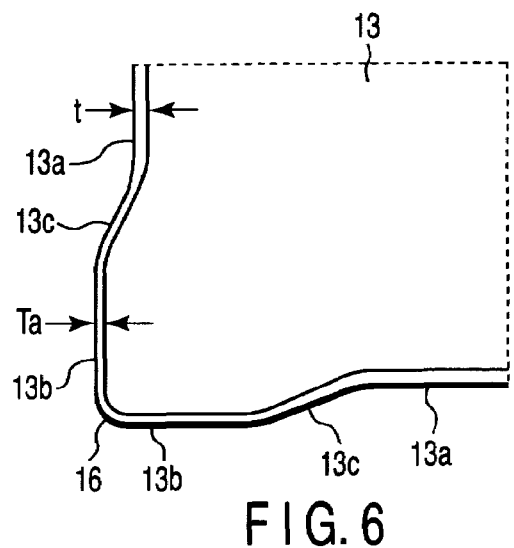
F I G. 6
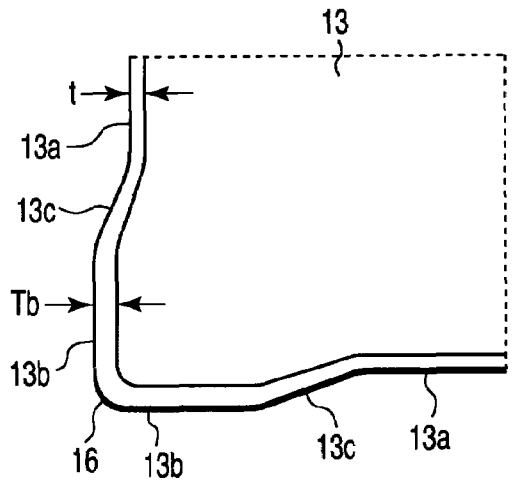
F I G. 7
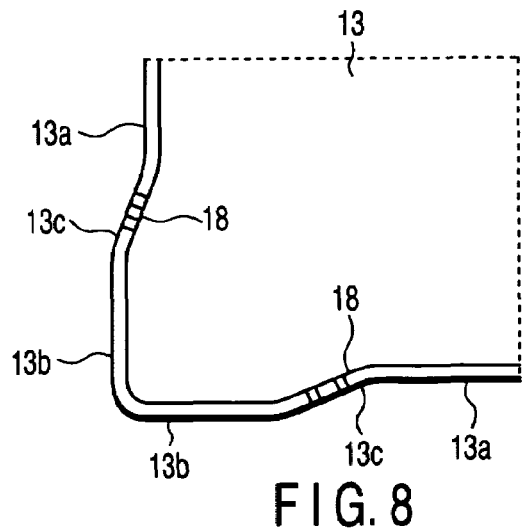
F I G. 8

MOBILE ELECTRONIC APPLIANCE

CROSS-REFERENCE TO RELATED APPLICATIONS

This application is based upon and claims the benefit of priority from prior Japanese Patent Application No. 2003-400828, filed Nov. 28, 2003, the entire contents of which are incorporated herein by reference.

BACKGROUND OF THE INVENTION

1. Field of the Invention

The present invention relates to a mobile electronic appliance, particularly, to a mobile electronic appliance exhibiting improved impact resistance characteristics.

2. Description of the Related Art

In recent years, a precision unit such as a hard disk, a magnetic disk drive-or an optical drive is housed as a peripheral unit in a mobile electronic appliance such as a notebook type personal computer or a PDA (personal digital assistant). Also, the mobile electronic appliance is generally equipped with a display section and a keyboard section as an interface with the user. Where the mobile electronic appliance of the particular construction is accidentally dropped onto, for example, the ground, the casing of the mobile electronic appliance is possibly broken by the impact, leading to the breakage of the display section or the keyboard section. It is also possible for the precision unit housed in the casing to be broken by the impact.

Structural measures are taken in the conventional mobile electronic appliance of the particular construction in order to prevent the casing and the parts housed in the casing from being broken if the mobile electronic appliance is dropped onto, for example, the ground. For example, it is disclosed in Japanese Patent Disclosure (Kokai) No. 10-322039 and Japanese Patent No. 2392265 that a plurality of small impact resistant members made of, for example, a rubber-series resin are housed as separate members within the casing of the electronic appliance. The impact resistant member is formed of a rubber-series resin such as a urethane-series resin or a silicone-series resin and is mounted in a replaceable manner to the four corners of the casing or around the casing. Alternatively, the particular impact resistant member is fixed to the casing by using, for example, an adhesive. An additional measure for protecting the precision unit housed in the mobile electronic appliance is disclosed in, for example, "IBM Home Page 'HDD Shock Absorber', searched for on Jan. 27, 2003, internet <www-6.ibm.com./jp/pc/design/hddshock.html>". To be more specific, disclosed in this article is an electronic appliance in which a small projection or a buffer member formed integral with the casing is arranged in that region of the bottom portion of the casing which is positioned right under the precision unit housed in the casing. Also disclosed in this article is an apparatus in which that region of the casing which is positioned right under the precision unit is swollen to form a dome configuration so as to produce a buffering effect.

However, in the conventional measure for protecting the electronic appliance by using an impact resistant member as pointed out above, it is necessary to prepare separately the impact resistant member. This gives rise to the problems that the number of parts used is increased and that the material cost and the manufacturing cost are increased. What should also be noted is that used is a rubber-series resin. Since it is difficult to utilize a rubber series resin in a coating operation, the use of the rubber-series resin gives rise to an additional problem that the degree of freedom is impaired in terms of the design. In addition, the mounting strength between the casing of the electronic appliance and the impact resistant member tends to be rendered insufficient so as to give rise to the problem that, when an impact has been applied, the impact resistant member is detached so as to make it difficult to continuously protect the electronic appliance.

Still further, in the protection structure of the electronic appliance, which uses a relatively small projection or buffer member housed in the casing, it is necessary to pay attention to the fact that, if the dropping height is increased, this increase the impact force received from the floor surface. In this case, the bottom portion of the casing tends to be deformed in a local region around the projection or the buffer member. Also, the casing tends to be warped about the fulcrum provided by the projection or the arranging point of the buffer member so as to enlarge the contact region between the casing and the floor surface. Where that region of the precision unit housed in the casing which is positioned right above the contact region is brought into contact with the inner surface of the casing of the electronic appliance under the situation described above, a problem is generated in that a serious impact is imparted to the precision unit housed in the casing. The impact force applied to the precision unit noted above is equal to that in the case where the electronic appliance is dropped directly onto the floor surface. Alternatively, where a turning moment is generated because of the defect in the arrangement of the projection, the impact force noted above is larger than that in the case where the electronic appliance is dropped directly onto the floor surface. Further, where the buffer member or the buffering structure is formed right below the precision unit housed in the casing, an additional problem is generated in that the impact is transmitted directly to the housed precision unit positioned right above the buffer member or the buffering structure in the case where the dropping height is increased so as to lose the buffering effect.

BRIEF SUMMARY OF THE INVENTION

An object of the present invention is to provide a mobile electronic appliance that permits improving the impact resistance in the case where the mobile electronic appliance is dropped onto, for example, the floor or the ground.

Another object of the present invention is to provide a mobile electronic appliance that permits decreasing the weight and lowering the manufacturing cost while maintaining a high impact resistance.

According to an aspect of the present invention, there is provided a mobile electronic appliance, comprising:

a display section having an outer peripheral region;

a first casing having a substantially rectangular box-shape and having a upper surface and first side surface portions, configured to cover the outer peripheral region of the display section and received the display section therein;

an electronic unit; and a second casing having a substantially rectangular box-shape, configured to receive and mount the electronic units, the first casing being so coupled to the second casing such that the first casing can be fold back on the upper surface of the second casing to cover the display section, the second casing having second side surface portions, four corner portions, and sloped portions, the corner portions being formed integral with the second side surface portions and formed contiguous to the second side surface portions with the sloped portions each interposed between the corner portion and the side surface portion, the four corner portions being swollen outward relative to the second side surface portions, void spaces being formed inside of the swollen corner portions, the distance between the swollen corner portion and the second side surface portion of the second casing being determined not to be smaller than the braking distance that is determined from a prescribed dropping height, and the swollen corner portion protruding outward from the first side portion of the first casing when the first casing can be fold back on the upper surface of the second casing.

According to another aspect of the present invention, there is provided a mobile electronic appliance, comprising:

a display section having an outer peripheral region;

a first casing having a substantially rectangular box-shape and having a upper surface and first side surface portions, configured to cover the outer peripheral region of the display section and received the display section therein;

an electronic unit having a mechanical precision mechanism that is to be protected against an external impact;

a second casing having a substantially rectangular box-shape, configured to receive and mount the electronic unit in the second casing, the first casing being so coupled to the second casing such that the first casing can be fold back on the upper surface of the second casing to cover the display section, the second casing having a substantially flat bottom surface, second side surface portions, four corner portions, and sloped portions, the corner portions being formed integral with the second side surface portions and formed contiguous to the second side surface portions with the sloped portions each interposed between the corner portion and the side surface portion, the four corner portions being swollen outward relative to the second side surface portions, void spaces being formed inside of the swollen corner portions, the distance between the swollen corner portion and the second side surface portion of the second casing being determined not to be smaller than the braking distance that is determined from a prescribed dropping height, the swollen corner portion protruding outward from the first side portion of the first casing when the first casing is fold back on the upper surface of the second casing, and the bottom surface including a predetermined region facing the electronic unit;

a pair of extended projections formed on the bottom surface of the second casing such that the extended projections are arranged in substantially parallel outside the predetermined region, the extended projections extending along the predetermined region.

BRIEF DESCRIPTION OF THE SEVERAL VIEWS OF THE DRAWING

FIG. 6 is a partial cross sectional view schematically showing a part of the second casing of the mobile electronic appliance according to a modified embodiment of the present invention;

FIG. 7 is a partial cross sectional view schematically showing a part of the second casing of the mobile electronic appliance according to another modified embodiment of the present invention;

FIG. 8 is a partial cross sectional view schematically showing a part of the second casing of the mobile electronic appliance according to another modified embodiment of the present invention;

DETAILED DESCRIPTION OF THE INVENTION

A mobile electronic appliance according to one embodiment of the present invention will now be described in detail with reference to the accompanying drawings.

Figure 1:
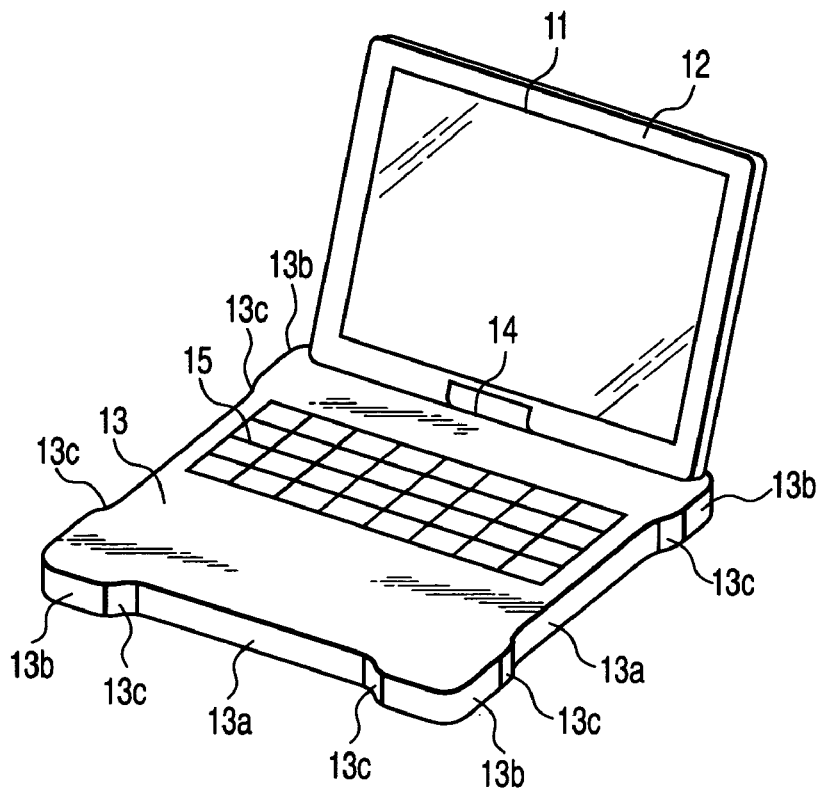
FIG. 1 is an oblique view schematically showing the construction of a mobile electronic appliance according to a first embodiment of the present invention.

FIG. 1 shows the construction of a mobile electronic appliance according to a first embodiment of the present invention.

A notebook type personal computer as shown in FIG. 1, a PDA (personal digital assistant), etc. are known to the art as a mobile electronic appliance. In the notebook type personal computer, a substantially rectangular box-shaped first casing 12 corresponding to a lid portion, which can be folded, is mounted to a second casing 13 corresponding to a substantially rectangular box-shaped base portion. The first casing 12 is mounted to the second casing 13 by a hinge mechanism 14 such that the first casing 12 can be folded to cover the upper surface of the second casing 13. A rectangular liquid crystal display section 11 is housed in the first casing 12 such that the liquid crystal display section 11 is protected by the peripheral frame of the first casing 12. Also, a keyboard 15 is mounted on the second casing 13, and a precision unit 33 having a mechanical precision mechanism is housed in the second casing 13. The precision unit 33 includes, for example, a hard disk, a magnetic disk drive or an optical drive whose function may be possibly impaired by the impact from the outside.

When the notebook type personal computer of the construction described above is used, the first casing 12 constituting the lid portion of the personal computer is opened, and the keyboard mounted on the second casing 13 is operated. On the other hand, when the notebook type personal computer is carried about, the first casing 12 is folded so as to cover the upper surface of the second casing 13. In other words, the entire personal computer comprising the first casing 12 and the second casing 13 assumes a substantially rectangular box-shaped state and is carried about under this particular state.

The PDA (not shown) constituting a mobile electronic appliance is of the type that the lid portion is removed from the notebook type personal computer of the construction described above. In general, the PDA is formed to have a rectangular box-shaped outer configuration like the notebook type personal computer in the state of carrying about the personal computer. In the case of the PDA, a display section and an operating section are formed on the upper surface of the box-shaped casing 13. In the operating stage, a display screen displayed on the display section is touched, or the operating section is operated so as to switch the display screen. On the other hand, the PDA is carried about under the state that the screen display is turned off.

Figure 2:
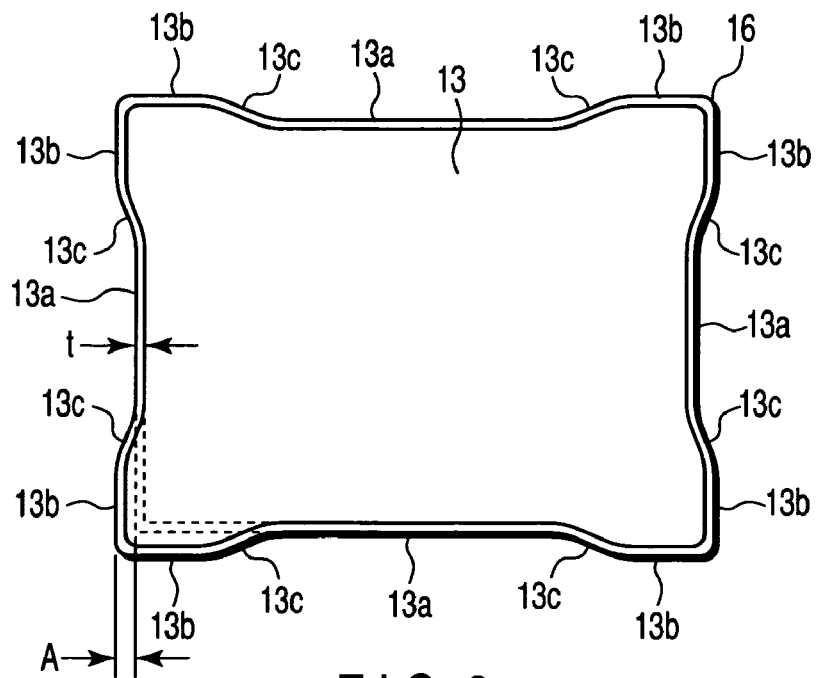
FIG. 2 is a lateral cross sectional view schematically showing a cross section of the second casing included in the mobile electronic appliance shown in FIG. 1.
Figure 3:
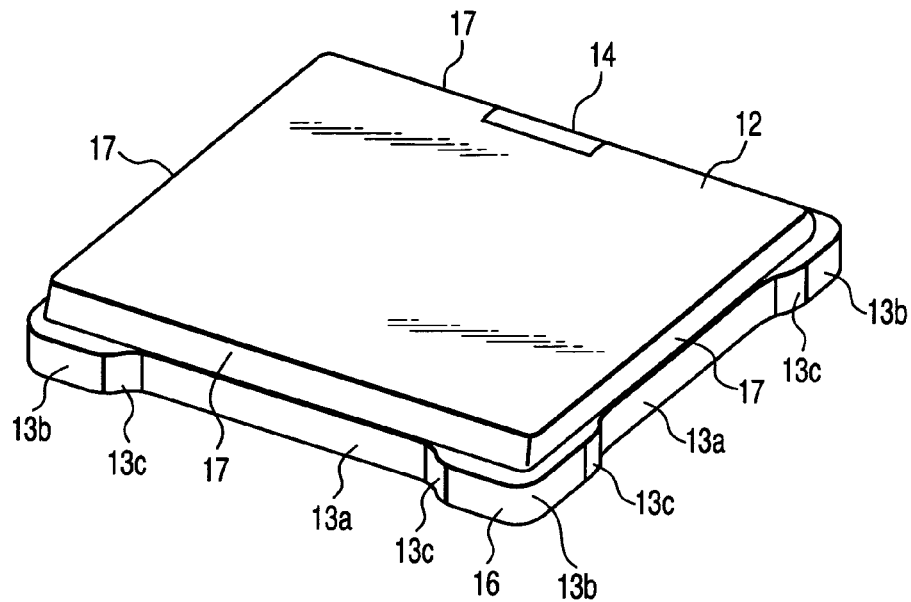
FIG. 3 is an oblique view schematically showing the mobile electronic appliance shown in FIG. 1 under the state that the second casing is closed by the first casing.

In the mobile electronic appliance according to the first embodiment of the present invention, swollen portions 16 that are swollen outward are formed in the four corner portions of the second casing 13, as shown in FIGS. 1, 2 and 3. These swollen portions 16 are formed integral with the second casing 13. To be more specific, the second casing 13 comprises a linear outer wall 13a corresponding to the side of the rectangular second casing 13, a swollen wall 13b corresponding to the corner portion of the rectangular second casing 13, and a sloped wall 13c connecting the linear outer wall 13a to the swollen wall 13b. The sloped wall 13c continuously extends outward from the linear outer wall 13a so as to bend the second casing 13, and the swollen wall 13b is formed contiguous to the sloped wall 13c. The swollen wall 13b is formed in substantially an L-shape in the plane parallel to the bottom of the second casing 13, so as to make roundish the corner portion of the second casing 13. It should be noted that the sloped wall 13b imparts a step A to the swollen wall 13b relative to the linear outer wall 13a so as to maintain a void state within the swollen corner portion 16. The step A for forming the void is defined to be not smaller than a braking distance Δx required for a prescribed dropping height in order to absorb the impact in the dropping stage. The prescribed dropping height noted above is defined on the basis of JIS (Japanese Industrial Standards)-C0044 directed to the drop of an electronic appliance. Also, the braking distance Δx noted above implies the recessed amount (recessed distance) in the deformed portion of the second casing 13 included in the mobile electronic appliance when the mobile electronic appliance is allowed to drop from a prescribed height onto the ground so as to deform that portion of the second casing 13 which impinges on the ground. In other words, the braking distance Δx implies the amount of deformation (recession) of the second casing 13 that permits absorbing the impact. However, it is also possible to define the braking distance Δx on the basis of the situation in which the electronic appliance is normally used in view of the stipulation in JIS-C0044 noted above. To be more specific, since the mobile electronic appliance can be carried about, it is also possible to define the braking distance Δx on the basis of the height of the electronic appliance when the electronic appliance is carried about, which is derived from the average height of the user. For example, it is possible for the braking distance Δx to be defined on the basis that the height of the electronic appliance when the electronic appliance is carried out is set at 65 to 70 cm, more strictly, at 70 cm. Also, since the mobile electronic appliance is used in general on a desk, it is possible for the braking distance Δx to be defined on the basis of the height of the general office desk or the height of the dining table. Where the braking distance Δx is defined on the basis of the height of the desk, the height of the desk is set similarly at 65 to 70 cm, more strictly at 70 cm.

Incidentally, in the second casing 13 shown in FIG. 2, the linear outer wall 13a, the swollen wall 13b and the sloped wall 13c, which collectively form the second casing 13, are set substantially equal to each other in thickness "t".

When the second casing 13 is dropped from its side surface onto, for example, a relatively flat floor so as to cause the impact to be imparted to the side surface of the second casing 13, the impact is imparted to the side surface of the second casing 13 in accordance with the posture of the second casing 13 in the dropping stage. Although the posture of the second casing 13 in the dropping stage is not constant, the impact given from, for example, the floor surface is mostly imparted to any of the swollen corner portions 16. Also, the direction of the impact given to the swollen corner portions 16 is not constant such that the impact is imparted in various directions in accordance with the posture of the second casing 13. However, since the colliding region including the swollen wall 13b and the sloped wall 13c, in which the collision takes place, is deformed within the void section corresponding to the step A, the impact is absorbed within the colliding region so as to protect the parts housed in the second casing 13 from the impact. Also, the swollen corner portion 16, even if deformed, can be brought back to the original shape relatively easily unless the impact is so strong as to break the swollen corner portion 16 or that the applied impact remains inside the elastic region of the swollen corner portion 16.

Where the mobile electronic appliance is folded such that the first casing 12 including the liquid crystal display section is positioned on the second casing 13 constituting the main body of the mobile electronic appliance as shown in FIG. 3 as in the stage of carrying about the mobile electronic appliance, a linear side surface of the first casing 12 positioned to face the second casing 13 is arranged inside the swollen corner portion 16, which extends outward in each of the four corner portions, of the second casing 13. It follows that, when the impact is imparted to the side surface of the second casing 13, the swollen corner portion of the second casing 13 receives first the impact as described above. As a result, the swollen corner portion is deformed so as to prevent the linear side surface 17 of the first casing 12 from receiving the first impact. After the impact has been absorbed by the swollen corner portion 16, the linear side surface 17 of the first casing 12 is caused to abut against, for example, the floor. However, the impact imparted to the linear side surface 17 of the first casing 12 is sufficiently small, compared with the impact. Such being the situation, the linear side surface 17 of the first casing 12 substantially constitutes a non-collision region to which the impact is not imparted. It follows that it is possible to protect the liquid crystal display section 11 housed in the first casing 12 from the impact.

The impact can be explained with reference to the one freedom spring model shown in FIGS. 4A and 4B in the case where the amount of deformation caused by the weight of the mobile electronic appliance is sufficiently small, compared with the amount of deformation of the mobile electronic appliance caused by the impact. To be more specific, FIG. 4A shows the state of the one freedom spring model before the dropping, and FIG. 4B shows the state of the one freedom spring model after application of the impact.

Figures 4A, 4B:
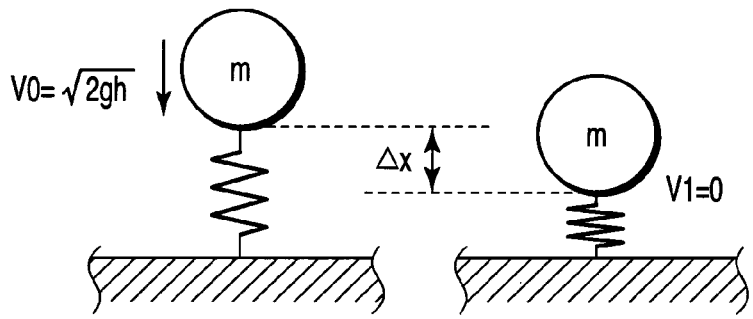
FIG. 4A schematically shows one freedom spring model before the drop of the mobile electronic appliance shown in FIG. 1 onto, for example, the ground.
FIG. 4B schematically shows one freedom spring model at the time when the impact is applied to the mobile electronic appliance shown in FIG. 1.

In the model shown in each of FIGS. 4A and 4B, the mass "m" of the mobile electronic appliance is regarded as the mass point, and the deformation in the colliding region is represented by a linear spring. If the dropping height is denoted by h [m] and the gravitational acceleration is denoted by g [m/s$^2$], the speed at the colliding stage with the floor is represented by formula (1) given below, and the braking distance $\Delta x$ until the speed of the mass point is lowered to reach the value represented by formula (2) given below is represented by formula (4) given below. In this case, the maximum acceleration acting on the mass point is represented by formula (3) given below:

$$V_0[m/s] = \sqrt{2gh} \quad (1)$$

$$V_1 = 0 [m/s] \quad (2)$$

$$G_{max}[m/s^2] \quad (3)$$

$$\Delta x[m] = 2\ gh/G_{max} \quad (4)$$

The largest mass of the mobile electronic appliance is about several kilograms. In this case, the dropping height given in Table B in the appendix of JIS-C0044 is 1 meter. Also, the dropping height of 1.22 [m] is required in the MIL standards (MIL-STD-810F-516.5). Where the dropping height [h] is assumed to be 1 [m], and critical acceleration allowable for the electronic part housed in the mobile electronic appliance is assumed to be 1,000 [G], which is equal to 9,800 m/s$^2$, the required braking distance $\Delta x$ is 0.002 [m]. It follows that the step A for forming the void noted above is at least 0.002 [m]. Preferably, the step A is set at a value not smaller than 0.002 [m] as long as the design of the second casing 13 is not impaired.

Where the step between the colliding surface of the swollen portion formed in each of the four corner portions of the second casing 13 of the mobile electronic appliance and the non-colliding surface of the second casing 13 is not smaller than the braking distance noted above, the generated acceleration is lower than the critical acceleration of the part housed in the second casing 13. However, where the step noted above is smaller than the braking distance noted above, the acceleration exceeding the critical acceleration of the part housed in the second casing 13 is generated so as to cause an inconvenience in the operation of the mobile electronic appliance. Also, in the case of forming the swollen corner portion integral with the second casing 13, it is possible to improve the impact resistance while avoiding the increases in the number of parts and in the weight of the mobile electronic appliance.

Figure 5:
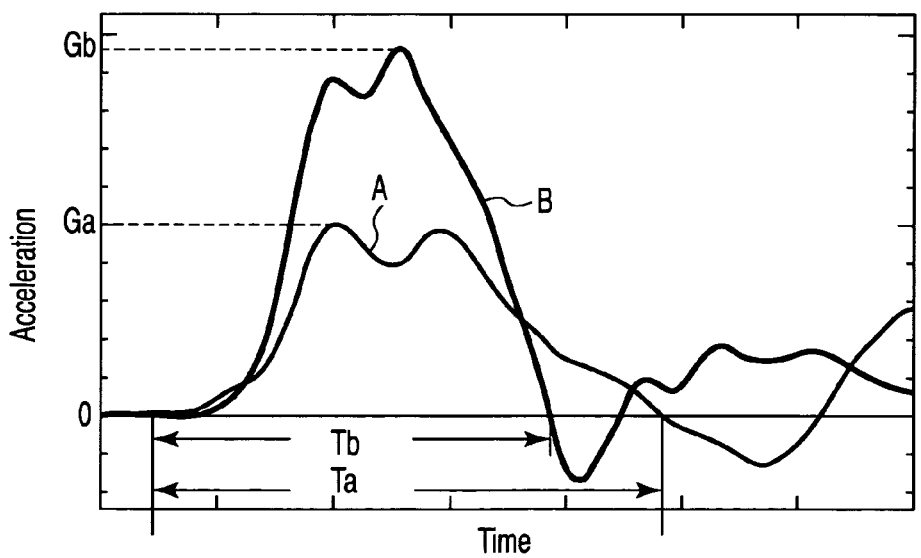
FIG. 5 is a graph showing the impact characteristics with respect to the drop onto, for example, the ground of each of the mobile electronic appliance shown in FIG. 1 and a mobile electronic appliance for the comparative case.

FIG. 5 is a graph showing the impact characteristics A imparted to the electronic unit included in the mobile electronic appliance shown in FIGS. 2 and 3 and the impact characteristics B imparted to the electronic unit included in the mobile electronic appliance for the comparative case in which the swollen corner portion 16 is not included. In the graph of FIG. 5, the acceleration is plotted on the ordinate, and time is plotted on the abscissa. The curve showing the impact characteristics B of the mobile electronic appliance including the second casing 13 in which the swollen corner portion 16 is not included has a peak value Gb of the first acceleration, and the acceleration acting time in this case is denoted by Tb in FIG. 5. On the other hand, the curve showing the impact characteristics A of the mobile electronic appliance including the second casing 13 having the swollen corner portion 16 has a peak value Ga of the first acceleration, and the acceleration acting time in this case is denoted by Ta. If the peak value Gb of the first acceleration and the acceleration acting time Tb for the impact characteristics B are compared with the peak value Ga of the first acceleration and the acceleration acting time Ta for the impact characteristics A, it can be understood that the acceleration acting time is prolonged so as to lower the peak value of the acceleration of the second casing 13 having the swollen corner portion 16 because the swollen corner portion is deformed in the colliding stage. As apparent from the comparison between curves A and B shown in FIG. 5, a big impact caused by the peak of the first acceleration is not imparted to the electronic unit where the swollen corner section 16 is formed in the second casing 13. It follows that, according to the construction shown in FIGS. 2 and 3, it is possible to protect the mobile electronic appliance from the impact without fail.

It should also be noted that a swollen corner portion having an inner void space is formed in the second casing 13 of the mobile electronic appliance shown in FIGS. 2 and 3 on the assumption that the mobile electronic appliance is carried about by the user. The particular measure is taken due to the possibility of the mobile electronic appliance being dropped to, for example, the ground while the mobile electronic appliance is being carried about. As apparent from FIGS. 2 and 3, the mobile electronic appliance according to the first embodiment of the present invention is not formed to present a simple rectangular configuration. Since the swollen corner portions are formed in the second casing 13, the side portions of the rectangular configuration are substantially recessed. It follows that the mobile electronic appliance is held by the user at the recessed side portions. Since the recessed side portions are held by the user, the mobile electronic appliance can be carried about without fail. In other words, the mobile electronic appliance of the particular shape produces an additional effect of preventing the mobile electronic appliance from being dropped erroneously to, for example, the ground.

A mobile electronic appliance according to a modified embodiment of the present invention will now be described with reference to FIGS. 6 to 9. In the following description, those portions of the mobile electronic appliance which are equal to the portions of the mobile electronic appliance described above are denoted by the same reference numerals so as to avoid the overlapping description.

FIG. 6 is a partial cross sectional view schematically showing in a broken fashion the construction of a single corner portion of the second casing 13 included in the mobile electronic appliance according to another embodiment of the present invention.

In the second casing 13 shown in FIG. 6, the thickness Ta of each of the swollen wall 13b and the sloped wall 13c of the second casing 13 is set smaller than the thickness "t" of the linear outer wall 13a of the second casing 13. Where the second casing 13 is formed of a metallic material having a large Young's modulus, it is effective to decrease the thickness of the swollen corner portion 16 because the rigidity in each of the four corner portions is lowered so as to increase the amount of deformation of the swollen corner portion in the colliding stage. As a result, it is possible to improve the impact absorbing capability of the swollen corner portion 16.

FIG. 7 is a partial cross sectional view schematically showing in a broken fashion the construction of a single corner portion of the second casing 13 included in the mobile electronic appliance according to another modified embodiment of the present invention.

In the second casing 13 shown in FIG. 7, the thickness Tb of each of the swollen wall 13b and the sloped wall 13c is set larger than the thickness "t" of the linear outer wall 13a of the second casing 13. Where the second casing 13 is formed of a resin material having a small Young's modulus and a low tensile strength, it is possible to increase the rigidity of each of the four corner portions of the second casing 13 by increasing the thickness of the swollen corner portion 16. It follows that it is possible to prevent the swollen corner portion 16 from being broken while maintaining the effect of absorbing the impact, i.e., the effect produced by the deformation of the swollen corner portion 16 in the colliding stage.

FIG. 8 is a partial cross sectional view schematically showing in a broken fashion a single corner portion of the second casing 13 included in the mobile electronic appliance according to still another modified embodiment of the present invention.

As shown in FIG. 8, at least one through-hole 18 is formed in the sloped portion of the second casing 13 so as to improve the effect of absorbing the impact. The rigidity of the sloped portion is lowered by the presence of the hole 18 so as to make it possible to increase the deformation of the swollen portion in the colliding stage. As a result, it is possible to improve the impact absorption effect.

Figure 9:
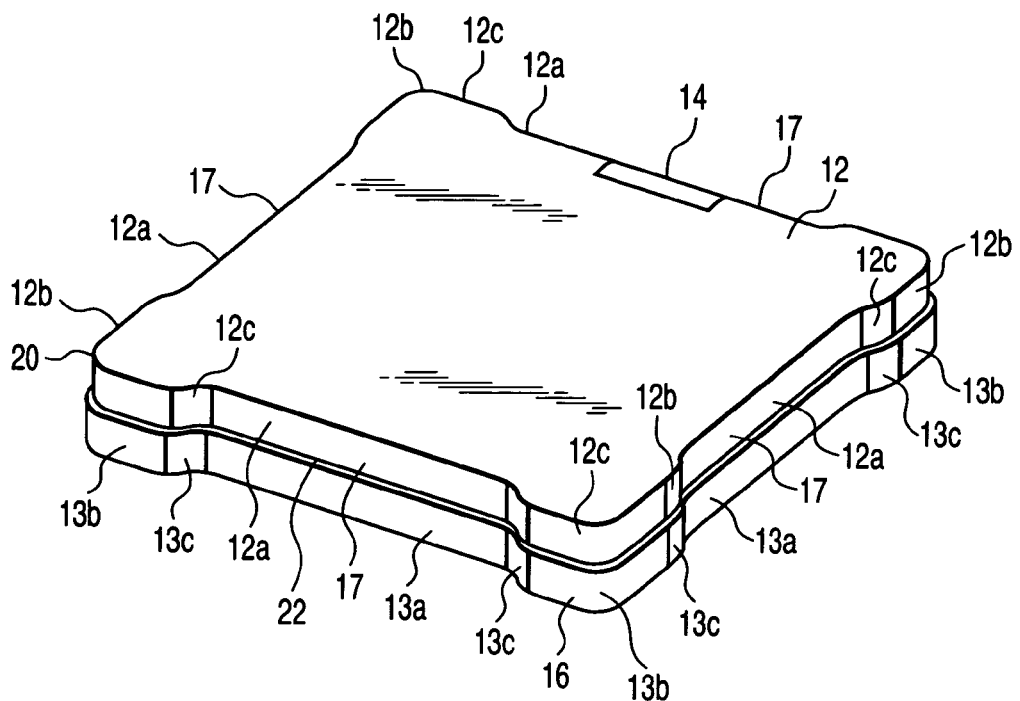
FIG. 9 is an oblique view schematically showing the construction of a mobile electronic appliance according to another modified embodiment of the present invention.

In the mobile electronic appliance shown in each of FIGS. 1 and 2, the swollen corner portion 16 is formed in the second casing 13 alone. However, it is also possible to form swollen portions 20 in the four corner portions of the first casing 12 as well as the four swollen corner portions 16 formed in the second casing 13, as shown in FIG. 9, which is directed to another modified embodiment of the present invention. As shown in FIG. 9, the swollen corner portions 20 formed in the first casing 12 are constructed like the swollen corner portions 16 of the second casing 13 such that a swollen wall 12b is formed contiguous to a linear outer wall 12a with a sloped wall 12c interposed therebetween in a manner to have a void region formed in the swollen wall 12b. Preferably, the first casing 12 including the swollen corner portions 20 is sized smaller than the second casing 13 including the swollen corner portions 16. In this case, under the state that the first casing 12 is folded so as to abut against the upper surface of the second casing 13, a peripheral region 22 in the upper surface of the second casing 13 protrudes outside the periphery of the first casing 12. In other words, the first casing 12 and the second casing 13 are arranged such that the circumferential side surface of the second casing 13 is positioned outside the circumferential side surface of the first casing 12.

The particular construction described above is advantageous in the case where the mobile electronic appliance is erroneously dropped from the side surface onto, for example, the ground when the mobile electronic appliance is being carried about. Specifically, where the mobile electronic appliance is erroneously dropped from the side surface onto, for example, the floor, the circumferential side surface of the second casing 13 extruding outward from the circumferential side surface of the first casing 12 is brought into contact first with, for example, the floor surface. In addition, since the contact region is limited mainly to the swollen corner portion 16 of the second casing 13, the impact is absorbed mainly in the swollen corner portion 16. In general, the weight of the electronic unit housed in the second casing 13 is larger than the weight of, for example, the liquid crystal display section 11 housed in the first casing 12. Such being the situation, when the mobile electronic appliance is dropped onto, for example, the floor while the mobile electronic appliance is being carried about, it is highly possible for the second casing 13 to be brought into contact first with, for example, the floor surface, compared with the first casing 12. It follows that, when the mobile electronic appliance is dropped onto, for example, the floor, the impact is absorbed first by the swollen corner portion 16 of the second casing 13 and, then, the first casing 12 abuts against, for example, the floor surface. Even if the side surface of the first casing 12 collides against, for example, the floor surface, the impact of the collision is absorbed by the swollen corner portion 20 of the first casing 12. It follows that it is possible to protect without fail the display section 11 housed in the first casing 12 from the impact.

Needless to say, it is apparent that the embodiments described previously in conjunction with the second casing 13 with reference to FIGS. 5 to 7 can also be applied in respect of the thickness of the wall of the first casing 12.

Each of the embodiments described above is directed to the case where the mobile electronic appliance is dropped from the side surface onto, for example, the floor. However, the mobile electronic appliance is not necessarily dropped from the side surface onto, for example, the floor while the mobile electronic appliance is being carried about. It is possible for the mobile electronic appliance to be dropped from the back surface onto, for example, the floor. It is also possible for the mobile electronic appliance to be dropped from the side surface onto, for example, the floor and, then, to be rebounded such that the impact is applied to the bottom surface of the mobile electronic appliance. Such being the situation, it is desirable for the mobile electronic appliance shown in FIG. 1, particularly, the bottom surface of the second casing 13 housing the electronic unit accompanied by a precision mechanical part, to be protected from the impact.

Figure 10:
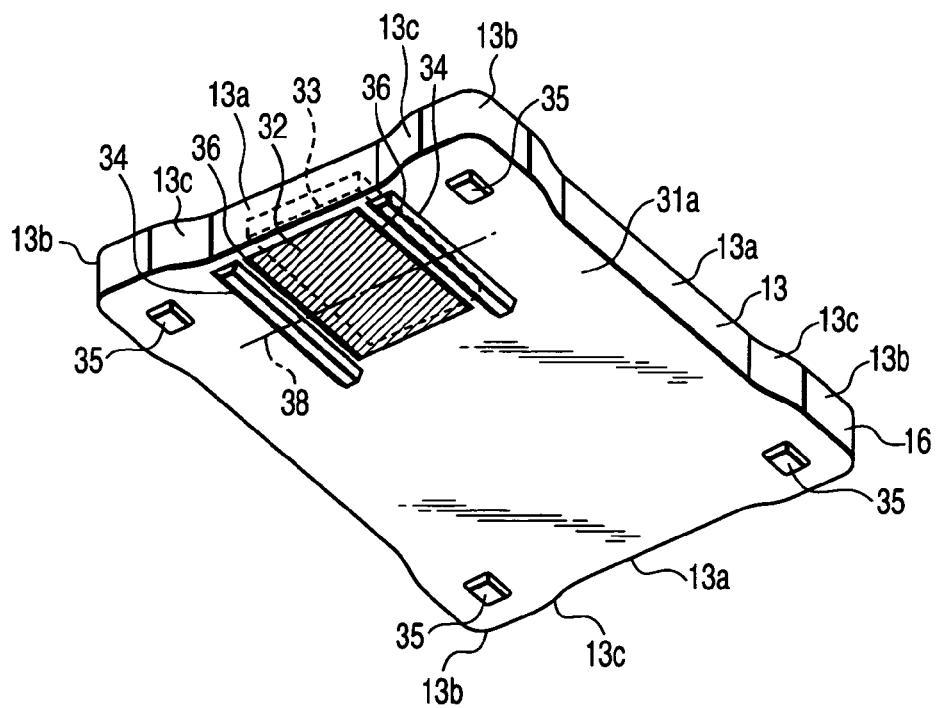
FIG. 10 is an oblique view schematically showing the back surface of a mobile electronic appliance according to another embodiment of the present invention.

FIG. 10 is an oblique view schematically showing the back surface of the mobile electronic appliance according to another embodiment of the present invention, in which the second casing 13 is provided with a pair of extended projections 34 each having a stripe or band shape on the bottom surface in addition to the swollen corner portions 16.

Projections consisting of a flexible material such as rubber, i.e., supporting pads 35, are formed in the four corner portions of a bottom surface 31a of the second casing 13. These projections act as support sections in the stage of disposing the electronic appliance on a flat surface such as a desk so as to prevent the bottom surface from being brought into direct contact with the disposing surface, thereby making it possible to dispose stably the electronic appliance on the flat surface.

Figure 11:
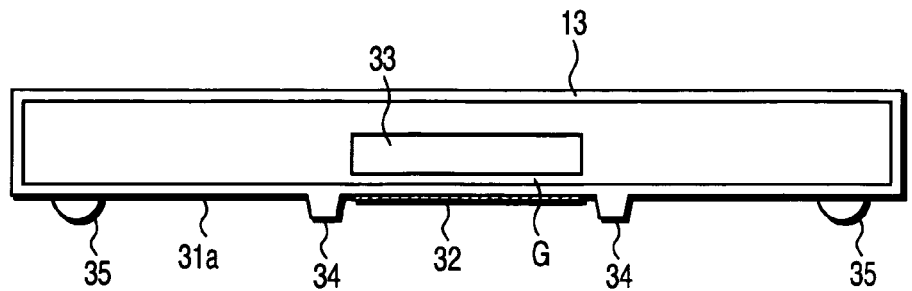
FIG. 11 is a cross sectional view schematically showing the construction of the mobile electronic appliance shown in FIG. 10.

A precision unit 33 housed in the second casing 13 is formed in general in a manner to have a slim rectangular box-like outer shape. In order to permit the precision unit 33 to be detachable from the second casing 13, the precision unit 33 is fixed with, for example, a screw to the side wall section of the second casing 13 by utilizing a support frame (not shown). As a result, the precision unit 33 is supported by the support mechanism within the second casing 13 via the support frame in a manner to form a small gap G between the inner bottom section of the precision unit 33 and the bottom surface of the second casing 13 as shown in FIG. 11. A pair of the extended projections 34, which have a height substantially equal to or larger than the height of the support pad 35, are formed to extend in parallel along the outer bottom surface of the second casing 13. Unlike the support pad 35, it is possible for the extended projections 34 to be formed integral with the second casing 13 by using a material similar to that of the second casing 13. Alternatively, it is also possible for the extended projections 34 to be formed of a material differing from the material of the second casing 13 and having buffer properties like the support pad 35 so as to be fixed by gluing to the bottom surface of the second casing 13.

The pair of the extended projections 34 are arranged outside the mutually facing both sides 36 of a substantially rectangular region 32 that is defined when the precision unit 33 is projected by the planar projection method on the bottom surface 31a of the second casing 13. Also, the extended projections 34 extend along the both sides 36 noted above. Incidentally, the rectangular region 32 noted above is shaded in FIG. 10. The extended projections 34 are arranged on the bottom surface 31a of the second casing 13 such that the center line of these extended projections 34 is coincident with a center line 38 passing through the geometric center of the substantially rectangular region 32, the center line 38 extending substantially in parallel to the side wall to which the precision unit 33 is fixed. In other words, the extended projections 34 having stripe or band shape are arranged in symmetry with respect to the center line 38. Also, the extended projection 36 has a length not smaller than half the length of the side 36 along the extended projection 34. Preferably, the extended projection 34 has a length substantially equal to that of the side 36 along the extended projection 34 or slightly larger than the length of the side 36. Also, the extended projection 34 has a length substantially equal to the length of the side 36 along the extended projection 34 or a length larger than the length of the side 36.

When the second casing 13 is dropped from the bottom section onto, for example, the floor in the mobile electronic appliance of the construction shown in FIG. 10, the extended projections 34 are allowed to collide against the floor simultaneously with the collision of the support pads 35 against the floor or slightly after the support pads 35 are allowed to collide against the floor. As a matter of fact, the slight delay in the collision of the support pads 35 against the floor noted above is negligible, and the extended projections 34 and the support pad 35 can be regarded as colliding against the floor simultaneously. The presence of the extended projections 34 permits preventing the bottom surface 31a of the second casing 13, particularly, the substantially rectangular region 32 of the bottom surface 31a on which is disposed the precision unit 33 that is heavy compared with the other part, from being brought into direct contact with the floor surface. Even if the extended projections 34 are formed, the impact given to the extended projections 34 is transmitted to the second casing 13 and, at the same time, to the precision unit 33, with the result that the precision unit 33 that is relatively heavy is moved together with the second casing 13. However, the pair of the extended projections 34 and the bottom surface region corresponding to the substantially rectangular region 32 that is held between the extended projections 34 perform the function of a frame of a rigid structure so as to prevent the entire bottom surface 31a from being warped. To be more specific, when the second casing 13 is dropped onto, for example, the floor, tension is imparted by the impact given to the extended projections 34 to the bottom surface of the substantially rectangular region 32 that is held between the pair of the extended projections 34. As a result, the rigidity of the bottom surface of the substantially rectangular region 32 is increased compared with the ordinary state so as to permit the frame of the rigid structure to protect the precision unit 33 without fail. Also, the impact imparted to the frame of the rigid structure is dispersed over the entire second casing 13 so as to make it possible to prevent a big impact from acting directly on the precision unit 33. To be more specific, the amount of the bending warp is lowered in the rectangular region 32 that is held between the pair of the extended projections 34 because the height of extended projection 34 is increased and the distance between the support points is decreased. It follows that it is possible to avoid the collision of the rectangular region 32 against the floor surface. Such being the situation, the precision unit 33 positioned right above the rectangular region 32 is unlikely to receive directly the impact force from the floor surface via the bottom surface 31a of the second casing 13. It should also be noted that the extended projections 34 are arranged in symmetry with respect to the geometric center line 38 as described previously. As a result, the impact applied to the extended projections 34 is dispersed relatively uniformly in the precision unit 33 via the extended projections 34 so as to make it possible to prevent the impact from being concentrated on a specified point.

Where the second casing 13 is dropped onto, for example, the floor in the comparative mobile electronic appliance in which the extended projections 34 are not formed, the precision unit 33 is moved simultaneously with the collision of the support pads 35 against the floor so as to cause the entire bottom surface 31a to be warped. Also, the rectangular region 32 having a heavy article disposed thereon is dropped toward the floor simultaneously with the drop of the second casing 13 onto the floor. It follows that the impact is applied directly to the precision unit 33.

In the embodiment described above, the extended projections 34 of band or stripe shape are arranged outside the both sides 36 of the substantially rectangular region 32 that is defined when the precision unit 33 is projected by the planar projection method onto the bottom surface 31a of the second casing 13. It is necessary for the extended projections 34 to be arranged outside the both sides 36 of the rectangular region 32, and it is undesirable for the extended projections 32 to be arranged on the rectangular region 32. Where the extended projections 34 are arranged on the rectangular region 32, the bottom surface of the rectangular region 32 is warped so as to cause the impact to be applied directly to the precision unit 33. The particular difficulty is equal to that in the case where the extended projections 34 are not arranged.

Figure 12:
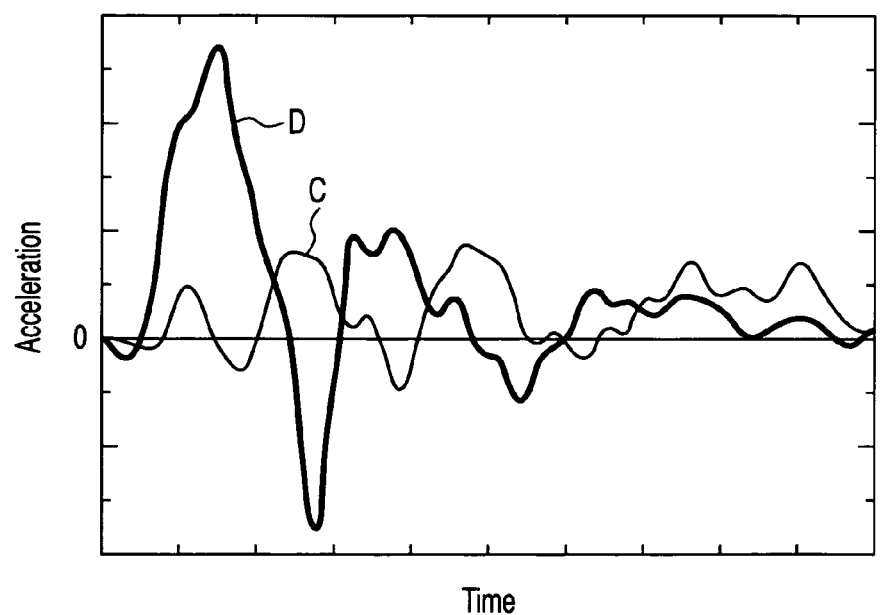
FIG. 12 is a graph showing the impact characteristics in respect of the drop onto, for example, the ground of each of the mobile electronic appliance shown in FIG. 10 and the mobile electronic appliance for the comparative case.

FIG. 12 is a graph showing the impact characteristics C imparted to the electronic unit included in the mobile electronic appliance in which the extended projections 34 are arranged outside the both sides 36 of the substantially rectangular region 32 as shown in FIG. 10 and also showing the impact characteristics D imparted to the electronic unit included in the comparative mobile electronic appliance in which the extended projections 34 are not arranged. In the graph of FIG. 12, the acceleration is plotted on the ordinate, and time is plotted on the abscissa. In the electronic unit housed in the second casing on which the extended projections are not arranged, a big acceleration is imparted to the electronic unit immediately after the drop of the second casing onto, for example, the floor as seen from curve D shown in FIG. 12. Then, a big rebound is generated in accordance with the impact given to the electronic unit, and the vibration that moves the electronic unit up and down is continued for a relatively long time. On the other hand, in the electronic unit housed in the second casing 13 provided with the extended projections 34, a relatively small first acceleration is imparted to the electronic unit immediately after the drop of the second casing 13 onto, for example, the floor, as seen from curve C shown in FIG. 12. Further, second and third accelerations higher than the first acceleration are imparted to the electronic unit and, then, the acceleration is gradually attenuated. It should be noted that the first, second and third accelerations included in curve C are sufficiently small, compared with the peak of the acceleration included in curve D. In other words, the first to third accelerations are imparted to the electronic unit in a time-divided fashion. As apparent from the comparison between curve C and curve D, a big impact is not imparted to the electronic unit in the case where the extended projections 34 are formed on the bottom surface of the second casing 13. In addition, the impact is dispersed and is moderately attenuated. It follows that, according to the construction shown in FIG. 9, it is possible to protect without fail the electronic unit housed in the casing from the impact.

Modified embodiments of the second casing 13 shown in FIG. 10 will now be described with reference to FIGS. 13 and 14.

Figure 13:
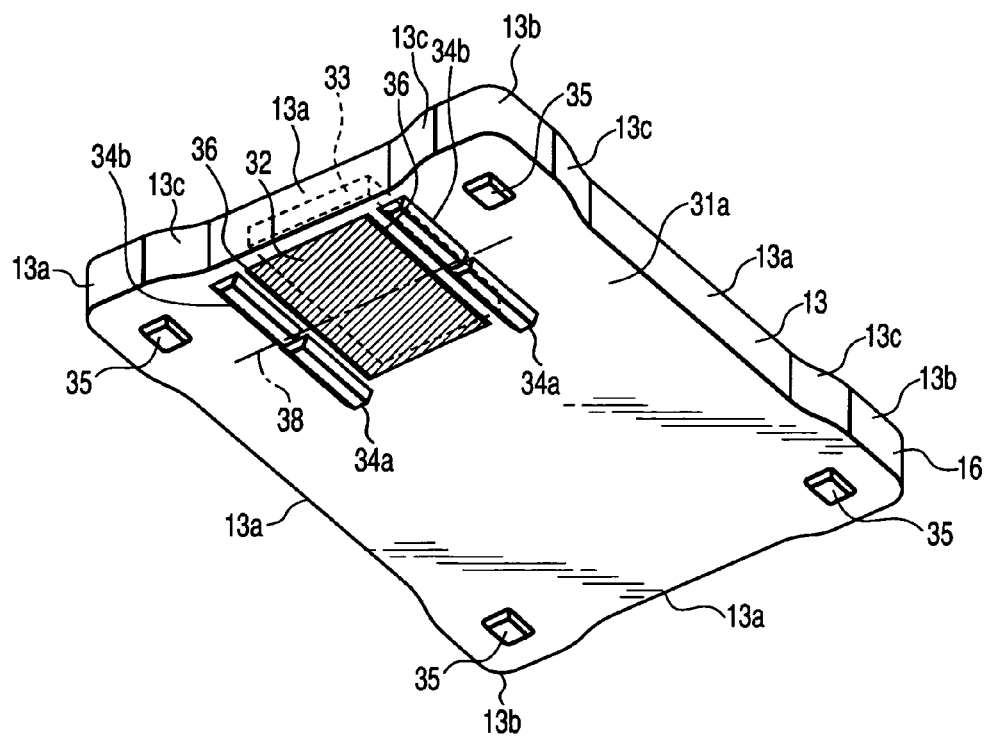
FIG. 13 is an oblique view schematically showing the back surface of a mobile electronic appliance according to a modified embodiment of the present invention.

It is possible for each of the pair of the extended projections 34 to be divided into two segments 34a and 34b, as shown in FIG. 13. To be more specific, stripe segments 34a, 34b of the extended projection 34 are arranged outside the both sides 36 of the substantially rectangular region 32. These stripe segments 34a, 34b are arranged in symmetry with respect to the center line 38, and are separated from each other by the gap through which extends the center line 38. The stripe segments 34a, 34b extend along the both sides 36 of the substantially rectangular region 32 as in the construction shown in FIG. 9. The stripe segments 34a, 34b are substantially equal to each other in width. Also, the sum of the lengths of the stripe segments 34a and 34b that are linearly arranged is substantially equal to or larger than the length of the side 36 of the substantially rectangular region 32 along which the extended projection 34 extends.

In the second casing 13 shown in FIG. 13, the stripe segments 34a, 34b are linearly arranged, and it is possible to arrange, for example, a screw hole in the gap between the stripe segments 34a and 34b. Also, it is apparent that it is not absolutely necessary for the extended projection 34 to be separated into two stripe segments 34a, 34b. It is also possible for the extended projection 34 to be separated into three or more stripe segments and for the separated stripe segments to be arranged linearly.

In the second casing 13 shown in FIG. 10, the extended projections 34 are arranged to extend along the both sides 36 corresponding to the longer sides of the substantially rectangular region 32. Alternatively, it is also possible to arrange extended projections 34e in a manner to extend along the mutually facing longer sides 36a of the substantially rectangular region 32 and to arrange extended projections 34f in a manner to extend along the mutually facing shorter sides 36b of the substantially rectangular region 32, as shown in FIG. 14. In the construction shown in FIG. 14, the substantially rectangular region 32 extends to reach the side wall of the second casing 13. In this case, it is possible for the extended projection 34f extending along the shorter side 36b positioned close to the side wall to be arranged within the substantially rectangular region 32 or not to be arranged at all. In other words, it suffices to form at least one extended projection 34f extending along the shorter side 36b of the substantially rectangular region 32 and to form the other extended projection 34f within the substantially rectangular region 32. Also, in the construction shown in FIG. 14, the extended projection 34f is arranged on the bottom surface 31a of the second casing 13. However, it is possible to arrange the extended projection 34f on the side surface 13a of the second casing 13 or on the upper surface within the second casing 13, not on the bottom surface 31a of the second casing 13.

Figure 14:
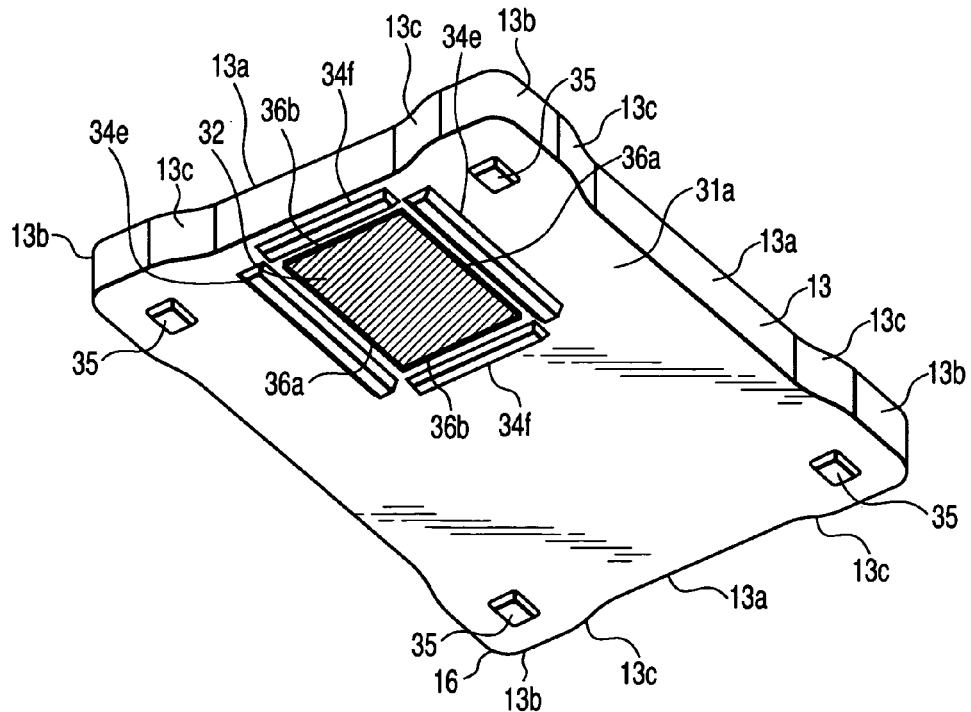
FIG. 14 is an oblique view schematically showing the-back surface of a mobile electronic appliance according to another modified embodiment of the present invention.

According to the second casing 13 shown in FIG. 14, the bottom surface 31a corresponding to the substantially rectangular region 32 are supported by the extended projections 34, 34e and 34f extending along the shorter sides and the longer sides of the substantially rectangular region 32. As a result, the construction shown in FIG. 14 can have a rigidity higher than that of the construction shown in FIG. 8. In addition, the impact can be dispersed more effectively in the construction shown in FIG. 14. It follows that it is possible to protect the electronic unit 33 housed in the second casing 13 from the external impact more effectively.

Figure 15:
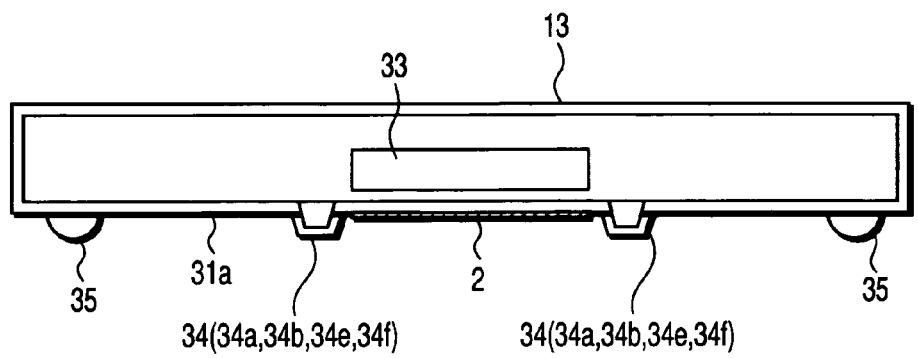
FIG. 15 is a cross sectional view schematically showing the construction of a mobile electronic appliance according to another modified embodiment of the present invention.
Figure 16:
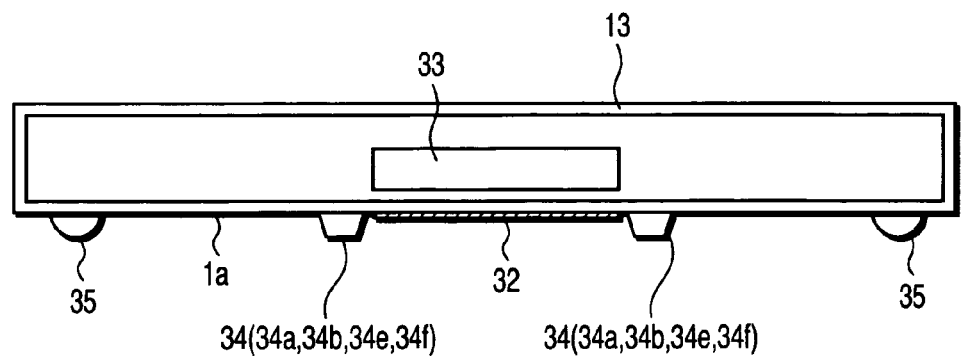
FIG. 16 is a cross sectional view schematically showing the construction of a mobile electronic appliance according to still another modified embodiment of the present invention.

It is possible for the extended projections 34e, 34f or the stripe segments 34a, 34b to be formed integral with the second casing 13 as shown in FIG. 11. It is possible for the extended projections 34e, 34f or the stripe segments 34a, 34b to be solid or to be hollow or recessed as shown in FIG. 15. Further, it is possible for the extended projections 34, 34e, 34f or the stripe segments 34a, 34b to be formed of a different material such as a rubber-series resin, a plastic material, or a metal. Still further, it is possible for the extended projections 34, 34e, 34f or the stripe segments 34a, 34b to be bonded or fixed to the second casing 13, as shown in FIG. 16.

As described above, the mobile electronic appliance according to the present invention makes it possible to improve the impact resistance when the mobile electronic appliance is dropped onto the floor or the ground.

What should also be noted is that the mobile electronic appliance of the present invention makes it possible to decrease the weight and to lower the manufacturing cost while maintaining a sufficient impact resistance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile electronic appliance, comprising:
    a display section having an outer peripheral region;
    a first casing having a upper surface and first side surface portions, configured to cover the outer peripheral region of the display section and received the display section therein;
    an electronic unit; and
    a second casing configured to receive and mount the electronic units, the first casing being so coupled to the second casing such that the first casing can be fold back on the upper surface of the second casing to cover the display section, the second casing having second side surface portions and four corner portions, the four corner portions being swollen outward relative to the second side surface portions, void spaces being formed inside of the swollen corner portions, the distance between the swollen corner portion and the second side surface portion of the second casing being determined not to be smaller than the braking distance that is determined from a prescribed dropping height, and the swollen corner portion protruding outward from the first side portion of the first casing when the first casing can be fold back on the upper surface of the second casing.

2. The mobile electronic appliance according to claim 1, wherein the swollen corner portion differs in thickness from the second side surface portion.

3. The mobile electronic appliance according to claim 1, wherein a second casing has a substantially rectangular box-shape.

4. The mobile electronic appliance according to claim 2, wherein a second casing has a substantially rectangular box-shape.

5. The mobile electronic appliance according to claim 1, wherein a second casing is configured to receive and mount the electronic units, the first casing is so coupled to the second casing such that the first casing can be fold back on the upper surface of the second casing to cover the display section, the second casing has second side surface portions, and four corner portions, and sloped portions, the corner portions are formed integral with the second side surface portions and formed contiguous to the second side surface portions with the sloped portions each interposed between the corner portion and the side surface portion, the four corner portions are swollen outward relative to the second side surface portions, void spaces are formed inside of the swollen corner portions, the distance between the swollen corner portion and the second side surface portion of the second casing is determined not to be smaller than the braking distance that is determined from a prescribed dropping height, and the swollen corner portion is protruded outward from the first side portion of the first casing when the first casing can be fold back on the upper surface of the second casing.

6. The mobile electronic appliance according to claim 5, wherein at least one through-hole is formed in the sloped portion.

7. A mobile electronic appliance, comprising:

a display section having an outer peripheral region;

a first casing having a substantially rectangular box-shape and having a upper surface and first side surface portions, configured to cover the outer peripheral region of the display section and received the display section therein;

an electronic unit having a mechanical precision mechanism that is to be protected against an external impact;

a second casing having a substantially rectangular box-shape, configured to receive and mount the electronic unit in the second casing, the first casing being so coupled to the second casing such that the first casing can be fold back on the upper surface of the second casing to cover the display section, the second casing having a substantially flat bottom surface, second side surface portions, four corner portions, and sloped portions, the corner portions being formed integral with the second side surface portions and formed contiguous to the second side surface portions with the sloped portions each interposed between the corner portion and the side surface portion, the four corner portions being swollen outward relative to the second side surface portions, void spaces being formed inside of the swollen corner portions, the distance between the swollen corner portion and the second side surface portion of the second casing being determined not to be smaller than the braking distance that is determined from a prescribed dropping height, the swollen corner portion protruding outward from the first side portion of the first casing when the first casing is fold back on the upper surface of the second casing, and the bottom surface including a predetermined region facing the electronic unit;

a pair of extended projections formed on the bottom surface of the second casing such that the extended projections are arranged in substantially parallel outside the predetermined region, the extended projections extending along the predetermined region.

8. The mobile electronic appliance according to claim 7, wherein the extended projections are positioned substantially in symmetry with respect to a reference line passing through the geometric center of the predetermined region.

9. The mobile electronic appliance according to claim 7, wherein the extended projections are molded integral with the second casing.

10. The mobile electronic appliance according to claim 7, wherein the extended projections are formed separately from the second casing and fixed to the second casing.

11. The mobile electronic appliance according to claim 7, wherein the extended projection has a length substantially equal to or larger than the length of each of the mutually facing sides of the predetermined region.

12. A mobile electronic appliance, comprising:

a display section having an outer peripheral region;

a first casing having a upper surface and first side surface portions, configured to cover the outer peripheral region of the display section and received the display section therein;

an electronic unit; and a second casing configured to receive and mount the electronic units, the first casing being so coupled to the second casing such that the first casing can be fold back on the upper surface of the second casing to cover the display section, the second casing having second side surface portions and four corner portions, the four corner portions being swollen outward relative to the second side surface portions, each of the four corner portions having a thickness substantially same as that of the second side surface portion, the distance between the swollen corner portion and the second side surface portion of the second casing being determined not to be smaller than the braking distance that is determined from a prescribed dropping height, and the swollen corner portion protruding outward from the first side portion of the first casing when the first casing can be fold back on the upper surface of the second casing.

13. The mobile electronic appliance according to claim 12, wherein a second casing having a substantially rectangular box-shape.

14. The mobile electronic appliance according to claim 12, wherein a second casing having a substantially rectangular box-shape.

15. The mobile electronic appliance according to claim 12, wherein a second casing configured to receive and mount the electronic units, the first casing being so coupled to the second casing such that the first casing can be fold back on the upper surface of the second casing to cover the display section, the second casing having second side surface portions, and four corner portions, and sloped portions, the corner portions being formed integral with the second side surface portions and formed contiguous to the second side surface portions with the sloped portions each interposed between the corner portion and the side surface portion, the four corner portions being swollen outward relative to the second side surface portions, the distance between the swollen corner portion and the second side surface portion of the second casing being determined not to be smaller than the braking distance that is determined from a prescribed dropping height, and the swollen corner portion protruding outward from the first side portion of the first casing when the first casing can be fold back on the upper surface of the second casing.

16. The mobile electronic appliance according to claim 15, wherein at least one through-hole is formed in the sloped portion.

* * * * *